United States Patent
Goh et al.

(10) Patent No.: US 12,242,724 B2
(45) Date of Patent: Mar. 4, 2025

(54) CONVERSION OF ACCESS DATA BASED ON MEMORY DEVICE SIZE

(71) Applicant: Micron Technology, Inc., Boise, ID (US)

(72) Inventors: Mow Yiak Goh, Boise, ID (US); Mark Clouse, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 38 days.

(21) Appl. No.: 17/944,509

(22) Filed: Sep. 14, 2022

(65) Prior Publication Data

US 2024/0086067 A1  Mar. 14, 2024

(51) Int. Cl.
*G06F 3/06* (2006.01)

(52) U.S. Cl.
CPC .......... *G06F 3/0607* (2013.01); *G06F 3/0659* (2013.01); *G06F 3/0673* (2013.01)

(58) Field of Classification Search
CPC ..... G06F 3/0607; G06F 3/0659; G06F 3/0673
See application file for complete search history.

(56) References Cited

U.S. PATENT DOCUMENTS

| | | | |
|---|---|---|---|
| 4,654,787 A | 3/1987 | Finnel et al. | |
| 5,907,512 A | 5/1999 | Parkinson et al. | |
| 6,026,465 A | 2/2000 | Mills et al. | |
| 7,149,865 B2 | 12/2006 | Chamberlain et al. | |
| 2014/0368945 A1* | 12/2014 | Blount | G06F 3/0659 |
| | | | 360/48 |
| 2016/0371037 A1* | 12/2016 | Horn | G06F 3/0608 |

* cited by examiner

*Primary Examiner* — Kalpit Parikh
(74) *Attorney, Agent, or Firm* — Brooks, Cameron & Huebsch, PLLC

(57) ABSTRACT

Systems, apparatuses, and methods related to conversion of access data based on memory device size are described herein. An example apparatus can include a memory device, a mode register, an address decoder, and a memory controller. The memory device can include an array of memory cells. The memory controller can cause performance of a memory access. Performance of the memory access can include receiving access data associated with a first memory device size to access data stored in the memory device. The memory device can be a second memory device size. Performance of the memory access can further include accessing the data in the memory device that is the second memory device size using the access data.

14 Claims, 6 Drawing Sheets

CONVERSION OF ACCESS DATA BASED ON MEMORY DEVICE SIZE

TECHNICAL FIELD

The present disclosure relates generally to apparatuses, systems, and methods for conversion of access data based on memory device size.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
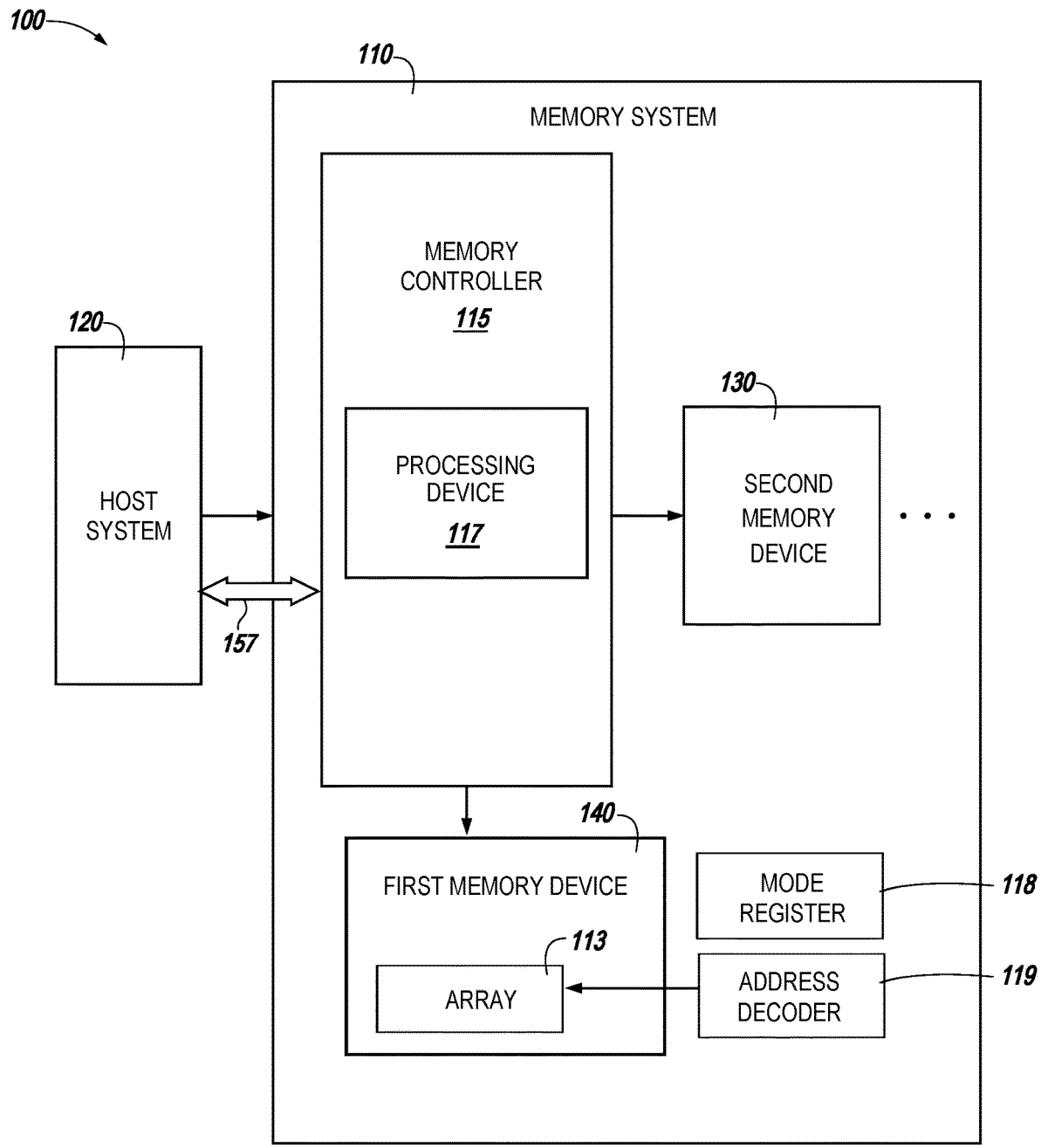
FIG. 1 illustrates an example computing system that includes a memory system in accordance with a number of embodiments of the present disclosure.

Systems, apparatuses, and methods related to a memory system for conversion of access data based on memory device size are described herein. Data stored in memory cells can be associated with an address that indicates a location in an array of memory cells where the data is stored. The array can be associated with a memory device of a particular memory device size. For example, a memory device size can include 64 gigabytes (Gb), 48 Gb, 32 Gb, 24 Gb, 16 Gb, 12 Gb, 8 Gb. In some instances, a host or other external memory system from the memory system may be configured for a particular memory device size. In this instance, the external memory system could communicate with a memory device that is the same memory device size.

However, it may be beneficial to have a memory system capable of converting access data received from the external memory system to being associated with a different memory device size than the memory device size the external memory system is configured to be used with. As an example, an external memory system may be configured to access data for a given size (e.g., 32 Gb) of data but a memory system may be associated with a smaller size (e.g., 24 Gb of data). However, examples are not limited to these memory device sizes. In this example, the memory system can beneficially convert the access data to be associated with the smaller size (e.g., 24 Gb) of the memory system size rather than the given size (e.g., 32 Gb) memory device size that the access data was initially configured to be used with.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, a "set of memory cells" or "set" refers to a physical arrangement of memory cells such as a row of memory cells or a portion of a row of memory cells, among other possible configurations of memory cells. As used herein, a "row of memory cells" or "row" refers to an arrangement of memory cells that can be activated together (e.g., via access lines). Each row can include a number of pages. As used herein, the term "page" and "pages of memory cells" can be interchangeably used. As used herein, a "page" refers to a unit of programming and/or sensing (e.g., a number of memory cells that are programmed and/or sensed together as a functional group). In some embodiments each row (or a subset of a row) can comprises one page of memory cells.

As used herein, designators such as "M," "R," "J," "S," "U," etc., for example, particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of sound devices) can refer to one or more sound devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. A group or plurality of similar elements or components can generally be referred to herein with a single element number. For example, a plurality of reference elements 203-0, . . . 203-M (e.g., 203-0 to 203-M) can be referred to generally as 203. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 illustrates an example computing system 100 that includes a memory system 110 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can include a memory system 110 including a memory controller 115 and memory devices 130, 140, a mode register 118, and an address decoder 119. The computing system 100 can be coupled to a host system 120.

In some embodiments, the memory controller 115 can be configured to manage a DRAM memory device. The memory devices 130, 140 can provide main memory for the computing system 100 or could be used as additional memory or storage throughout the computing system 100. As illustrated, memory device 130 can include an array 113. While not illustrated, memory device 130 may also include an array of memory cells. In some embodiments, the memory devices 130, 140 can be a ferroelectric field-effect transistor (FeFET) memory device. In another embodiment, the memory devices 130, 140 can be a dynamic random-access memory (DRAM), ferroelectric random-access memory (FeRAM), or a resistive random-access memory (ReRAM) device, or any combination thereof. The memory devices 130, 140 can include one or more arrays of memory cells, e.g., volatile and/or non-volatile memory cells. In various embodiments, the memory devices 130, 140 can include at least one array of volatile memory cells. Embodiments are not limited to a particular type of memory device. For instance, the memory devices can include RAM, ROM, DRAM, SDRAM, PCRAM, RRAM, and flash memory, among others. Although shown as two memory devices 130, 140, it will be appreciated that a single memory device or three or more memory devices, are contemplated within the scope of the disclosure.

A memory system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory systems 110. In some embodiments, the host system 120 is coupled to different types of memory system 110. The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory system 110, for example, to perform a command. As used herein, the term "command" refers to an instruction from a memory system to perform a task or function. For example, the memory controller 115 of the memory system 110 can cause a processing device 117 to perform a task based on a given command. In some embodiments, a command can include a memory request. That is, a command can be a request to read and/or write data from and/or to the memory device (e.g., a second memory device 130 and/or a first memory device 140). The host system 120 may, for example, write data to the memory system 110 and read data from the memory system 110 based on a command (e.g., memory request).

The host system 120 can be coupled to the memory system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory system 110. The host system 120 can further utilize an NVM Express (NVMe) interface to access components (e.g., memory devices 130, 140) when the memory system 110 is coupled with the host system 120 by the PCIe interface. The physical host interface can provide an interface for passing control, address, data, and other signals between the memory system 110 and the host system 120. In general, the host system 120 can access multiple memory systems via a same communication connection, multiple separate communication connections, and/or a combination of communication connections.

In various embodiments, the memory controller 115 may generate status information, which may be transferred to or from host system 120, for example via the sideband channel 157. The sideband channel 157 may be independent of (e.g., separate from) a double data rate (DDR) memory interface and/or a non-volatile memory express (NVMe) interface that may be used to transfer (e.g., pass) DDR commands and/or NVM commands between the host system 120 and the memory device 110. That is, in some embodiments, the sideband channel 157 may be used to transfer commands to cause performance of bit vector operations from the host system 120 to the memory device 110 while a control bus (not illustrated) is used to transfer DRAM commands and/or NVM commands from the host system 120 to the memory device 110. The memory devices 130, 140 can include any combination of the different types of non-volatile memory devices and/or volatile memory devices. Examples of volatile memory devices can be, but are not limited to, random access memory (RAM), such as dynamic random-access memory (DRAM) and synchronous dynamic random-access memory (SDRAM).

Some examples of non-volatile memory devices can include, but are not limited to, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Each of the memory devices 130, 140 can include one or more arrays of memory cells (such as array 113 in memory device 130). One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130, 140 can be grouped as pages that can refer to a logical unit of the memory device used to store data. In some embodiments, pages of memory cells can be comprised of one or more rows of memory cells. In addition, a row of memory cells can be comprised of one or more sets of memory cells.

The memory controller 115 (or controller 115 for simplicity) can communicate with the memory devices 130, 140 to perform operations such as reading data, writing data, or erasing data at the memory devices 130, 140 and other such operations. The memory controller 115 can include hardware such as one or more integrated circuits and/or discrete components, a buffer memory, or a combination thereof. The hardware can include digital circuitry with dedicated (i.e., hard-coded) logic to perform the operations described herein. The memory controller 115 can be a microcontroller, special purpose logic circuitry (e.g., a field programmable gate array (FPGA), an application specific integrated circuit (ASIC), etc.), or other suitable processor.

While the example memory system 110 has been illustrated in FIG. 1 as including the memory controller 115, in another embodiment of the present disclosure, a memory system 110 does not include a memory controller 115, and can instead rely upon external control (e.g., provided by an external host, or by a processor or controller separate from the memory system).

In general, the memory controller 115 can receive commands or operations from the host system 120 and can convert the commands or operations into instructions or appropriate commands to achieve the desired access to the memory device 130 and/or the memory device 140. The memory controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address (PBA), physical media locations, etc.) that are associated with the memory devices 130, 140. The memory controller 115 can further include host interface circuitry to communicate with the host system 120 via the physical host interface. The host interface circuitry can convert the commands received from the host system into command instructions to access the second memory device 130 and/or the first memory device 140 as well as convert responses associated with the second memory device 130 and/or the first memory device 140 into information for the host system 120.

The memory system 110 can include a mode register 118 used to store conversion data. For example, the mode register 118 can store mask data and/or force data. The mask data can indicate which bits of access data (e.g., address location data) to convert to an address associated with a different memory device size for the address location. The force data can indicate which actual bit values to transfer to the masked bits in the access data in order to convert the address location data, as will be described further below. The memory system 110 can include an address decoder 119 that can receive the converted access data and provide the address location for accessing the data in the memory device 130 and/or 140.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the memory controller 115 and decode the address to access the second memory device 130 and/or the first memory device 140.

Figure 2:
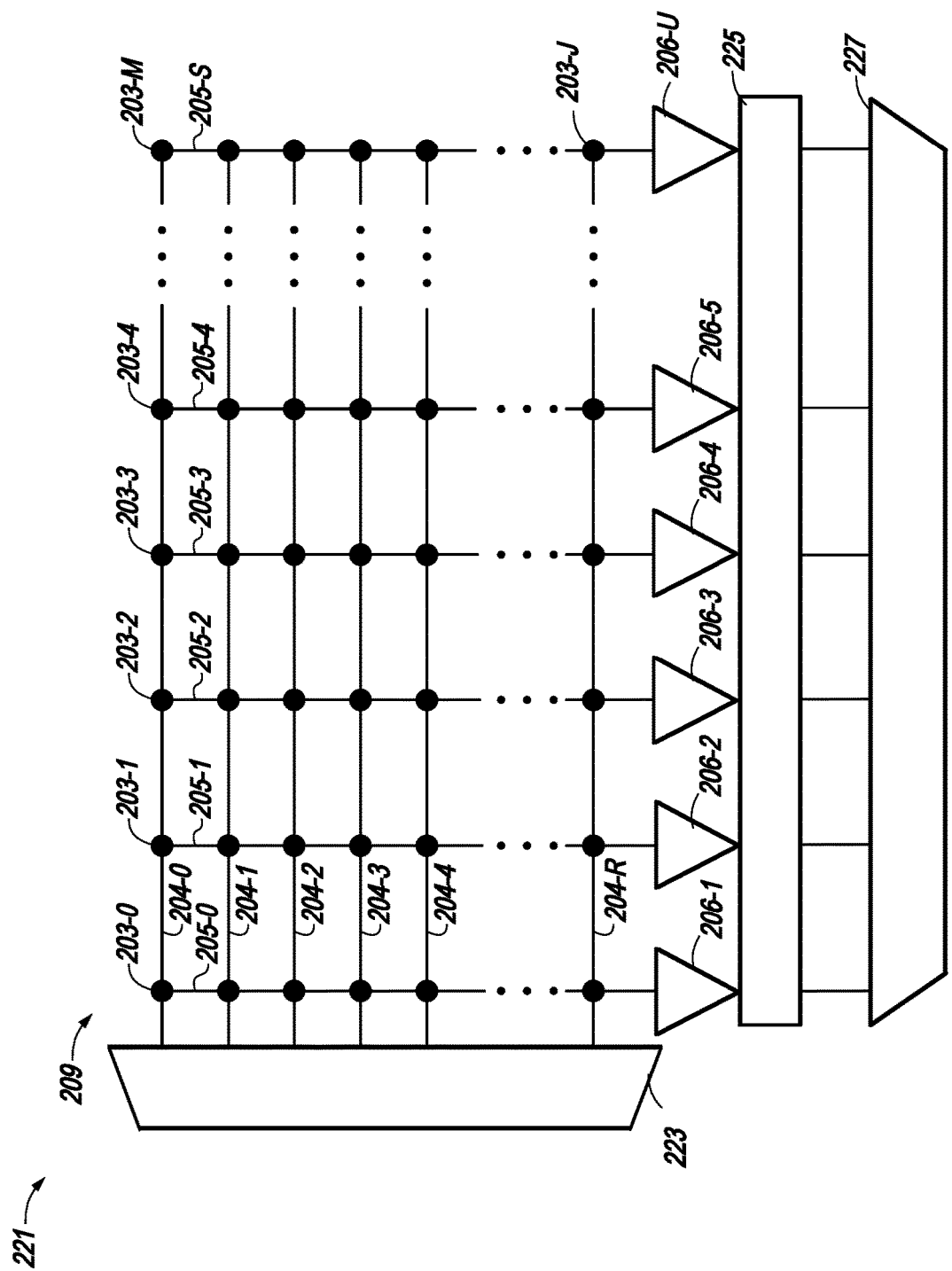
FIG. 2 illustrates an example functional diagram that includes memory cells arranged in rows in accordance with a number of embodiments of the present disclosure.

FIG. 2 illustrates an example functional diagram 221 that includes memory cells arranged in rows in accordance with a number of embodiments of the present disclosure. The functional diagram 221 can be used in connection with the computer system (e.g., the computer system 100 of FIG. 1). The components illustrated in the functional diagram 221 can be located within a number of memory devices (e.g., the memory devices 130, 140 in FIG. 1). The functional diagram can include an array 209 of memory cells 203-0 to 203-M, a row decoder 223, a row buffer 225, a plurality of sense amplifiers 206-1 to 206-U, and a multiplexer 227.

The array 209 includes memory cells (referred to generally as memory cells 203, and more specifically as memory cells 203-0 to 203-M and/or 203-0 to 203-J) coupled to rows of access lines 204-0, 204-1, 204-2, 204-3, 204-4, . . . , 204-R (referred to generally as access lines 204) and columns of sense lines 205-0, 205-1, 205-2, 205-3, 205-4, . . . , 205-S (referred to generally as sense lines 205). In some embodiments, one or more mode registers can be part of row 204-R in the array 209 and/or in additional rows of the array 209, however, embodiments are not so limited. Further, the array 209 of memory cells is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines.

Each column of sense lines can be coupled to a number of respective sense amplifiers 206-1, 206-2, 206-3, 206-4, 206-5, . . . , 206-U. Each of the respective sense amplifiers 206 can be coupled to a row buffer 225 used to store the data accessed from the memory cells 203. As an example, the memory cells 203 can be selectively activated through decode lines to transfer data sensed by respective sense amplifiers 206-0 to 206-U to the row buffer 225.

In some embodiments, a memory controller (such as the memory controller 115 in FIG. 1) can receive a first command and initiate a first activation on a first row of memory cells coupled to access line 204-0). The activation of the first row of memory cells can initiate a memory access of one or more memory devices. As used herein, activation of a row can include activation of all the rows or an activation of a subset of the rows. For instance, activation of a row can include activating all transistors of each memory cell 203-0 to 203-M in a row or can include activating some but not all transistors on a row (a subset of cells 203-0 to 203-M). Activation of a row (or similarly activation of a subset of a row) can permit information to be stored on or accessed from the row.

In some embodiments, as illustrated in FIG. 2, a multiplexer 227 can be used to select particular data in the row buffer 225 that corresponds to a column of sense lines and/or memory cells. As an example, a row address can be input to the row decoder 223 to indicate which row to access and a column address can be input to the multiplexer 227 to indicate which data associated with a column in the row buffer 225 to select so that particular data from a particular memory cell can be selected. The selected data can be transferred out via the multiplexer 227. For example, the memory controller can alter the logic state (e.g., switch the logic state from a "1" to a "0"). However, as used herein logic states are not limited to "1" or "0" and can include other values/types of logic states.

The access data can be used to locate the data in the memory cells 203 in the array 209. For example, the array 209 can be part of a memory system that is associated with a first memory device size. The access data may be received to be configured with a memory system of a second memory device size. A mode register storing mask data and force data can be used to convert the received access data from being associated with the second memory device size to being associated with the first memory device size. An address decoder can then use the converted access data to access a memory cell 203 in the array 209.

Figure 3A:
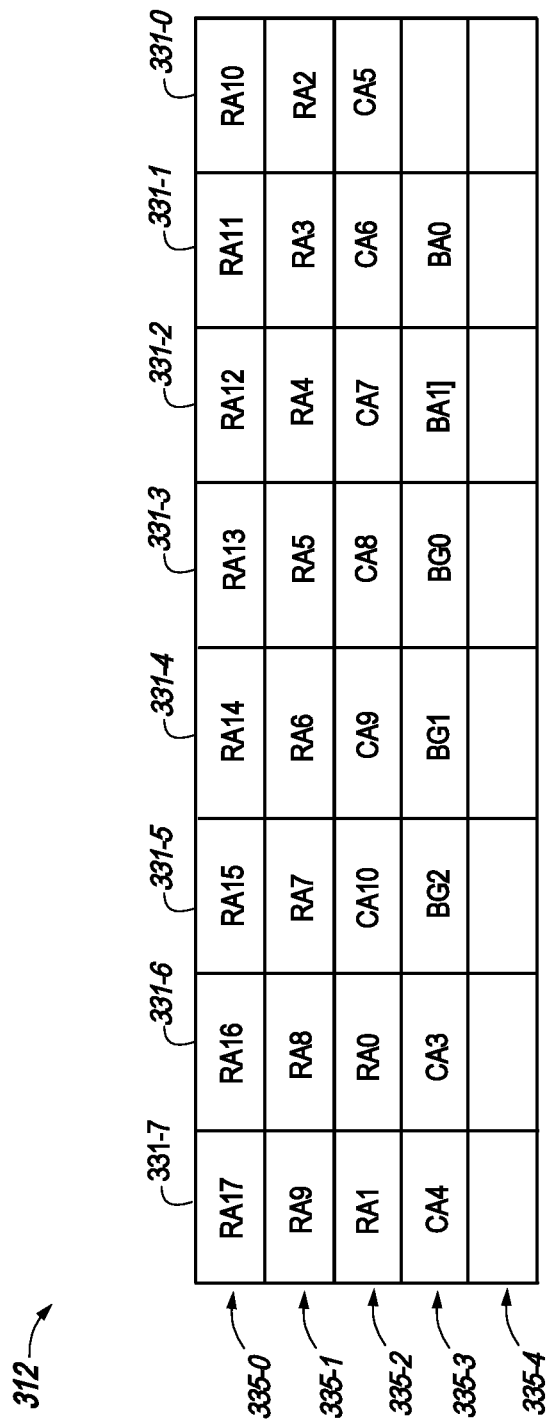
FIG. 3A is an example block diagram of mask data used to perform an access of data in accordance with a number of embodiments of the present disclosure.

FIG. 3A is an example block diagram of mask data 312 used to perform an access of data in accordance with a number of embodiments of the present disclosure. The mask data 312 can be stored in rows 335-0 to 335-4 (hereinafter referred to collectively as rows 335) and columns 331-7 to 331-0 (hereinafter referred to collectively as columns 331). Each bit of the rows 335 and columns 331 can be associated with a particular type of bit for accessing the data. For example, a first bit ("RA17") stored in row 335-0 and column 331-7 can be associated with a "$17^{th}$" row address ("RA") bit, a second bit ("RA16") can be associated with a "$16^{th}$" row address bit, and so forth, down to a "$0^{th}$", row address bit stored in row 335-2 and column 331-6.

Likewise, a "$10^{th}$" column address ("CA") bit ("CA10") can be stored in row 335-2 and column 331-5, and so forth, down to a "$3^{rd}$" column address bit in row 335-3 and column 331-6. The $2^{nd}$ through $0^{th}$ bits of the column address may be stored in additional locations and used for purposes not addressed here. Further, bank group ("BG") bits and bank address "BA") bits can be stored (e.g., in row 335-3 and columns 331-5 to 331-1) for purposes of identifying a location of banks of memory where the data is stored.

In some examples, particular row address and column address bits can be converted or modified in order to convert an address location associated with a first memory device size to an address location associated with a second memory device size. For example, an address location associated with a first memory device size may have a particular bit (e.g., a "1") for a $17^{th}$ RA bit ("RA 17") but be converted to a different bit (e.g., a "1") when converted to be associated with a second memory device size. Likewise, the $16^{th}$ RA bit, $15^{th}$ RA bit, etc., may be changed depending on what memory device size the access data was initially associated with and what memory device size the data is actually stored and associated with. The mask data 312 indicates which of these bits are to be converted or verified with the force data. The force data, explained in FIG. 3B, indicates which bit these masked bits should be converted to.

Figure 3B:
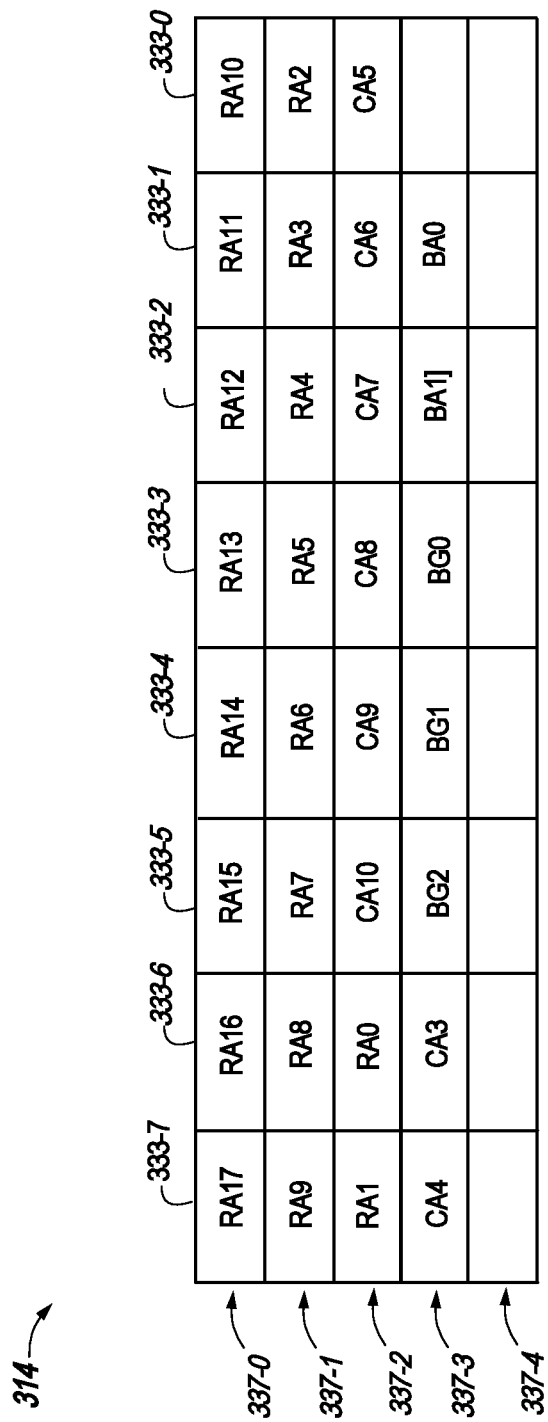
FIG. 3B is an example block diagram of force data used to perform an access of data in accordance with a number of embodiments of the present disclosure.

FIG. 3B is an example block diagram of force data 314 used to perform an access of data in accordance with a number of embodiments of the present disclosure. Similar to the mask data 312, the force data 314 can be stored in rows 337-0 to 337-4 (hereinafter referred to collectively as rows 337) and columns 333-7 to 333-0 (hereinafter referred to collectively as columns 333). Each bit of the rows 337 and columns 333 can be associated with a particular type of bit for accessing the data. For example, a first bit ("RA17") stored in row 337-0 and column 333-7 can be associated with a "$17^{th}$" row address ("RA") bit, a second bit ("RA16") can be associated with a "$16^{th}$" row address bit, and so forth, down to a "$0^{th}$" row address bit stored in row 337-2 and column 333-6.

Likewise, a "$10^{th}$" column address ("CA") bit can be stored in row 337-2 and column 333-5, and so forth, down to a "$3^{rd}$" column address bit in row 337-3 and column 333-6. The $2^{nd}$ through $0^{th}$ bits of the column address may be stored in additional locations and used for more specific purposes not addressed here. Further, bank group ("BG") bits and bank address "BA") bits can be stored in row 337-3 and columns 333-5 to 333-1 for purposes of identifying a location of banks of memory where the data is stored.

In some examples, particular row address and column address bits can be converted or modified in order to convert an address location associated with a first memory device size to an address location associated with a second memory device size. For example, an address location associated with a first memory device size may have a particular bit (e.g., a "1") for a $17^{th}$ RA bit ("RA 17") but be converted to a different bit (e.g., a "1") when converted to be associated with a second memory device size. Likewise, the $16^{th}$ RA bit, $15^{th}$ RA bit, etc., may be changed depending on what memory device size the access data was initially associated with and what memory device size the data is actually stored and associated with. The force data 314 indicates which bits to replace the masked bits with. As an example, a $17^{th}$ RA bit may be masked (e.g., a "1" may be stored in the mask data 312 of FIG. 3A in the $17^{th}$ RA bit position) and the force data at row 333-0 and column 337-7 (e.g., "RA17") can store a "1," indicating to change that $17^{th}$ RA bit to a "1" bit. If the $17^{th}$ RA bit was initially a "0" when received, the "0" would be changed to a "1." If the $17^{th}$ RA bit was initially a "1," the $17^{th}$ RA bit would remain a "1."

Each of the bits can be converted in such a way to change from an address location associated with a first memory device size to an address location associated with a second memory device size. In some examples, the memory system storing the data may be associated with a larger memory device size, such as 24 Gb in this example. The external memory system may be associated with a memory device size of 16 Gb. The conversion would result in only a portion of the memory device storing the data being used or operate at a partial density in order to still function with the external memory system. The memory system can still access the memory natively for design functionality, verification, and validation even though the memory device sizes do not match up. In one example, FIGS. 3A-3B are illustrated for us with binary address conversions and FIG. 3C is used for non-binary address conversations, as will be described further below.

Figure 3C:
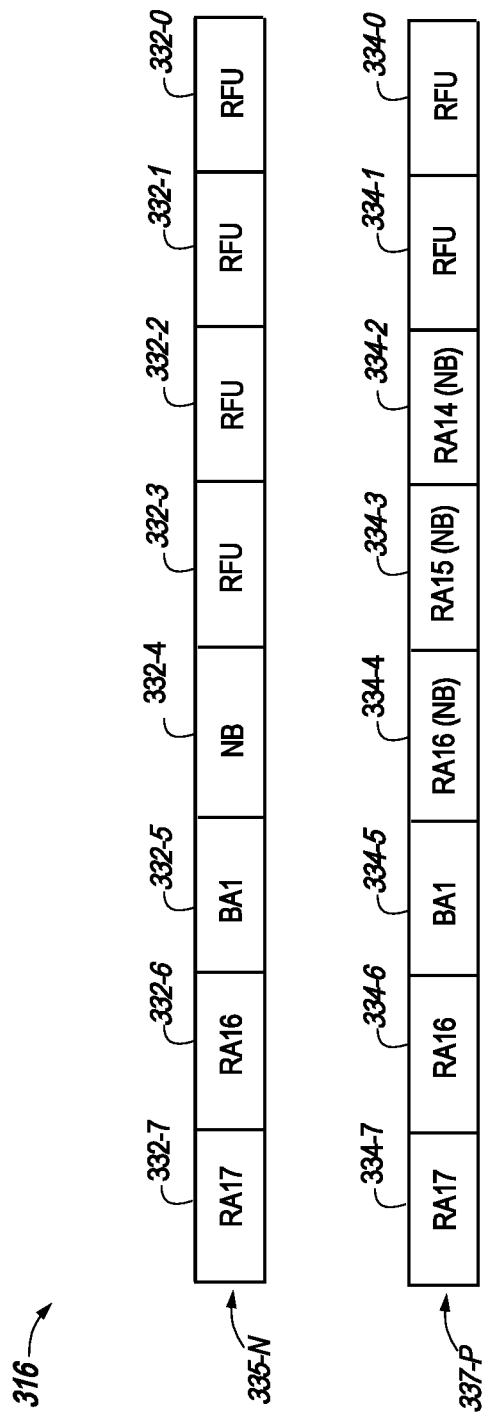
FIG. 3C is an example block diagram of a row of mask data and force data used to perform an access of data in accordance with a number of embodiments of the present disclosure.

FIG. 3C is an example block diagram 316 of a row of mask data 335-N and force data 337-P used to perform an access of data in accordance with a number of embodiments of the present disclosure. The row of mask data 335-N is an example of only a portion of the mask data illustrated in FIG. 3A, for ease of illustration. Likewise, the row of force data 335-P is an example of only a portion of the mask data illustrated in FIG. 3B, for ease of illustration. In some access data conversions, a particular bit may not operate in a binary fashion and therefore may have particular mask data and force data that provides the proper configuration in order to convert. For example, as the conversions are not a simple 16 Gb to 32 Gb, or some similar doubling or halfing of the address location size, the conversion may not be in a binary, 1 or 0, configuration. One example is converting from 24 Gb to 16 Gb, there is not an even halfing of the address location so there will be a non-binary fashion of converting the bits based on the mask data and the force data.

For means of illustration, the following Table 1 indicates a device size, a corresponding bank address used, the number of row addresses used for corresponding memory device size, and whether a bit is non-binary, as is described and illustrated in FIG. 3C.

TABLE 1

| Device size | Bank address | Row address | Non-binary? |
|---|---|---|---|
| 8 Gb | BA0 | R0-R15 | — |
| 12 Gb | BA0-BA1 | R0-R15 | Yes |
| 16 Gb | BA0-BA1 | R0-R15 | — |
| 24 Gb | BA0-BA1 | R0-R16 | Yes |
| 32 Gb | BA0-BA1 | R0-R16 | — |
| 48 Gb | BA0-BA1 | R0-R17 | Yes |
| 64 Gb | BA0-BA1 | R0-R17 | — |

The following Tables 2 and 3 illustrate these specific situations and conversion possibilities.

TABLE 2

| RA17 | RA16 | RA15 | RA14 | 64 Gb | 48 Gb | 32 Gb | 24 Gb | 16 Gb | 12 Gb |
|---|---|---|---|---|---|---|---|---|---|
| 0 | 0 | 0 | 0 | Valid | Valid | Valid | Valid | Valid | Valid |
| 0 | 0 | 0 | 1 | Valid | Valid | Valid | Valid | Valid | Valid |
| 0 | 0 | 1 | 0 | Valid | Valid | Valid | Valid | Valid | Valid |
| 0 | 0 | 1 | 1 | Valid | Valid | Valid | Valid | Valid | Inval |
| 0 | 1 | 0 | 0 | Valid | Valid | Valid | Valid | Inval | Inval |
| 0 | 1 | 0 | 1 | Valid | Valid | Valid | Valid | Inval | Inval |
| 0 | 1 | 1 | 0 | Valid | Valid | Valid | Inval | Inval | Inval |
| 0 | 1 | 1 | 1 | Valid | Valid | Valid | Inval | Inval | Inval |
| 1 | 0 | 0 | 0 | Valid | Valid | Inval | Inval | Inval | Inval |
| 1 | 0 | 0 | 1 | Valid | Valid | Inval | Inval | Inval | Inval |
| 1 | 0 | 1 | 0 | Valid | Valid | Inval | Inval | Inval | Inval |
| 1 | 0 | 1 | 1 | Valid | Valid | Inval | Inval | Inval | Inval |
| 1 | 1 | 0 | 0 | Valid | Inval | Inval | Inval | Inval | Inval |
| 1 | 1 | 0 | 1 | Valid | Inval | Inval | Inval | Inval | Inval |
| 1 | 1 | 1 | 0 | Valid | Inval | Inval | Inval | Inval | Inval |
| 1 | 1 | 1 | 1 | Valid | Inval | Inval | Inval | Inval | Inval |

As an example, Table 2 demonstrates that the 17$^{th}$ through 14$^{th}$ row address bits of values "0000," "0001," and "0010" are valid for all memory device sizes of 64, 48, 32, 24, 16, and 12 Gb. However, a value of "0011" is valid for all of the memory device sizes shown except 12 Gb, where it would be invalid ("Inval") for a 12 Gb memory device size. Likewise, the value of "1111" would only be valid for a 64 Gb memory device size. In this way, conversion accounts for such invalid access data bits and adjusts the configuration of the address bits accordingly to avoid errors and improper addressing, which the mask data and force data is used to do.

Table 3 illustrates example values for the mask data and force data based on the corresponding memory device size conversions.

TABLE 3

| Base | Mask | Force | Description | Result |
|---|---|---|---|---|
| 64 Gb | 0xD0 | 0x04 | RA17 = 0, RA16 = 0, RA14(NB) = 1 | 12 Gb |
| 64 Gb | 0xC0 | 0x00 | RA17 = 0, RA16 = 0, | 16 Gb |
| 64 Gb | 0xC0 | 0x80 | RA17 = 1, RA16 = 0, | 16 Gb |
| 64 Gb | 0xC0 | 0x40 | RA17 = 0, RA16 = 1, | 16 Gb |
| 64 Gb | 0xC0 | 0xC0 | RA17 = 1, RA16 = 1, | 16 Gb |
| 64 Gb | 0x90 | 0x08 | RA17 = 0, RA15(NB) = 1 | 24 Gb |
| 64 Gb | 0x90 | 0x88 | RA17 = 1, RA15(NB) = 1 | 24 Gb |
| 64 Gb | 0x80 | 0x00 | RA16 = 0 | 32 Gb |
| 64 Gb | 0x80 | 0x10 | RA16 = 1 | 32 Gb |
| 64 Gb | 0x10 | 0x10 | RA16(NB) = 1 | 48 Gb |
| 24 Gb | 0x40 | 0x00 | RA16 = 0 | 16 Gb |
| 24 Gb | 0x40 | 0x40 | RA16 = 1 | 16 Gb |
| 24 Gb | 0x50 | 0x04 | RA16 = 0, RA14(NB) = 1 | 12 Gb |
| 24 Gb | 0x50 | 0x44 | RA16 = 1, RA14(NB) = 1 | 12 Gb |

Referring to Table 3, as an example, the first row of converting from 64 Gb to 12 Gb with mask data of "0xD0" (e.g., "1101 0000" converting from hexadecimal notation) and force data of "0x04" (e.g., "0000 0100") results in row address bits of RA17=0, RA16=0, and RA14(NB)=1. Since the most significant ("1101") and next most significant ("1101") bits of the mask data are "1," then those bits would be indicated as being replaced by the force bits. The force bits for the most significant and next-most significant bits (e.g., "0000"), then those two bits would be forced to "00", resulting in the RA17 and RA16 being "0." Since the fourth next-most significant bit (e.g., "1101") is non-binary ("NB"), the "1" indicates whether to use non-binary mode.

Referring to Table 3, as an example, the second row of converting from 64 Gb to 16 Gb with mask data of "0xC0" (e.g., "1100 0000") and force data of "0x00" (e.g., "0000 0000") would result in row address bits of RA17=0 and RA16=0. Since the most significant ("1100") and next most significant ("1100") bits of the mask data are "1," then those bits would be indicated as being replaced by the force bits. The force bits for the most significant and next-most significant bits (e.g., "0000"), then those two bits would be forced to "00", resulting in the RA17 and RA16 being "0."

Figure 4:
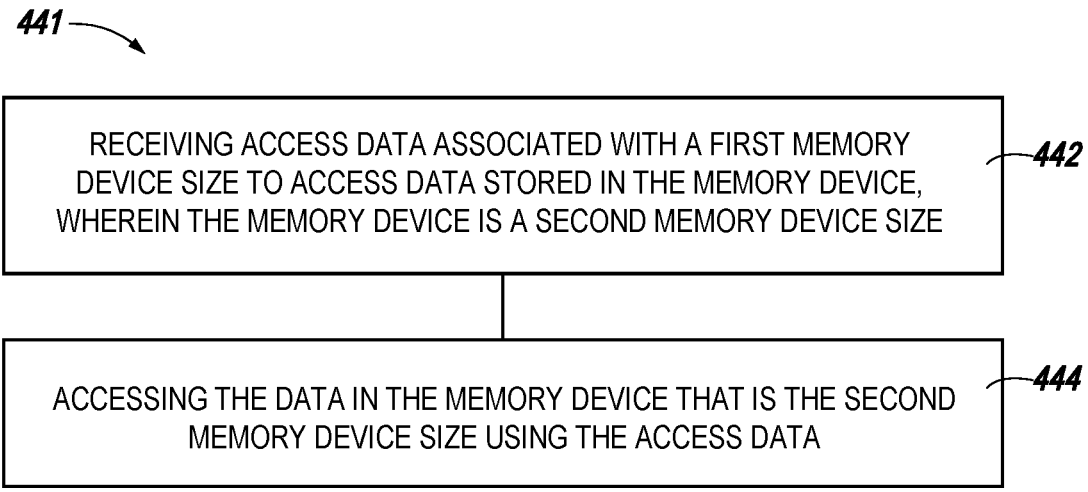
FIG. 4 illustrates a diagram representing an example method for conversion of access data based on memory device size in accordance with a number of embodiments of the present disclosure.

FIG. 4 illustrates a diagram representing an example method 441 for conversion of access data based on memory device size in accordance with a number of embodiments of the present disclosure. In some embodiments, a computer system (e.g., the computer system 100) can include a memory controller (e.g., the memory controller 115 of FIG. 1) and a processing device (e.g., the processing device 117 of FIG. 1). The memory controller can cause the processing device to perform the conversion of the access data in accordance with the description above.

At 442, the method 441 includes receiving access data associated with a first memory device size to access data stored in the memory device. The memory device can be a second memory device size that is different than a first memory device size, as detailed herein. In some examples, the first memory device size can be 32 gigabytes (GBs) and the second memory device size can be 24 GBs. In some examples, the first memory device size can be 64 gigabytes (GBs) and the second memory device size can be 48 GBs. Performance of a memory access can include receiving the access data and the receipt can be caused by the memory controller. Performance of the memory access can include accessing address data in a mode register.

At 444, the method 441 includes accessing the data in the memory device that is the second memory device size using the access data (e.g., the converted access data). The access data can be converted, as detailed herein. The address data in the mode register can include mask data and force data. The mask data can include a number of bits including a mask that indicates which bits to modify in order to access the data in the memory device. The force data can include a number of bits that indicate which bits of the address data to modify. An address decoder of a memory system including the memory controller can be configured to receive the mask data and the force data to modify the address data in order to perform the accessing of the data. The force data can include a number of bits that are used to determine an address to access that is performed in a non-binary fashion.

Figure 5:
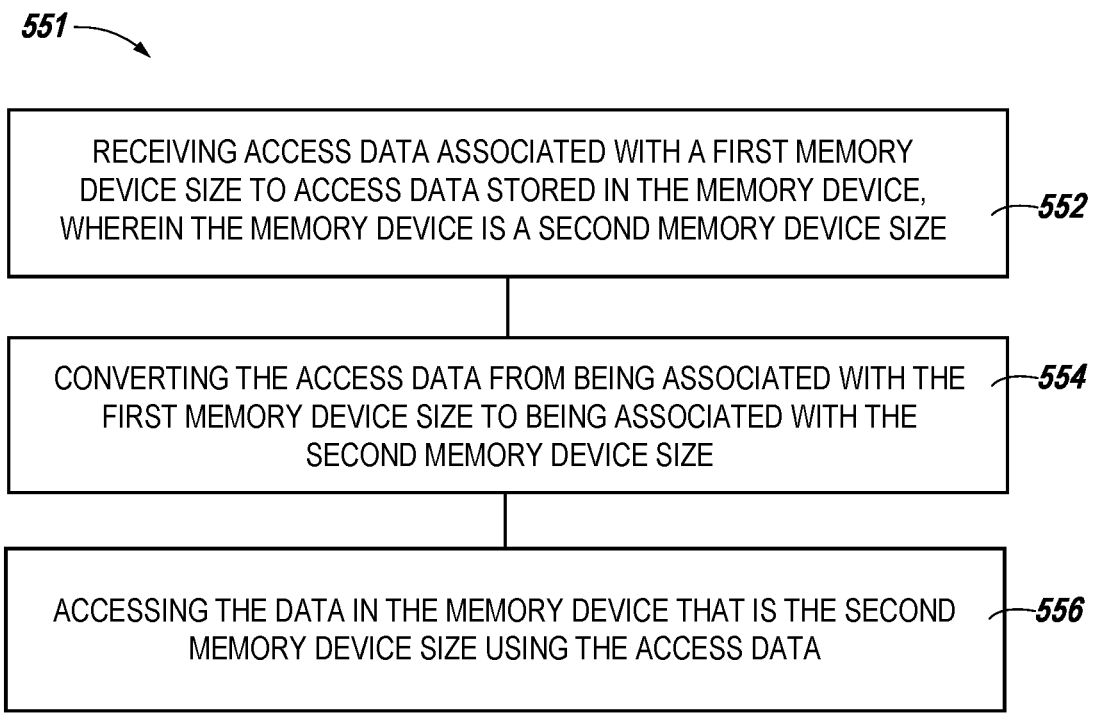
FIG. 5 illustrates a diagram representing an example method for conversion of access data based on memory device size in accordance with a number of embodiments of the present disclosure.

FIG. 5 illustrates a diagram representing an example method 551 for conversion of access data based on a memory device size in accordance with a number of embodiments of the present disclosure. In some embodiments, a computer system (e.g., the computer system 100) can include a memory controller (e.g., the memory controller 115 of FIG. 1) and a processing device (e.g., the processing device 117 of FIG. 1). The memory controller can cause the processing device to perform the conversion in accordance with the description above.

At 552, the method 551 includes receiving access data associated with a first memory device size to access data stored in the memory device. The memory device is a second memory device size. In some examples, the first memory device size is greater than the second memory device size. In some examples, the first memory device size is smaller than the second memory device size. In some examples, the first memory device size is not divisible by the second memory device size by a factor of 2. In some examples, the second memory device size is not divisible by the second memory device size by a factor of 2.

At 554, the method 551 includes converting the access data associated with the first memory device size to converted access data associated with the second memory device size. Converting the access data can include using mask data to indicate which portions of the access data to modify. The mask data can be located in a mode register coupled to memory device. In some examples, converting the access data can include using force data to indicate which data values to store at particular locations within the access data. The force data can be located in a mode register coupled to the memory device. The data values stored at the particular locations can convert the access data to being associated with the second memory device size. The converted access data can be sent to an address decoder to determine an address location for accessing the data.

At 556, the method 551 describes accessing the data in the memory device that is the second memory device size using the access data (e.g., the converted access data). The data can be accessed using the location determined by the address decoder. The address decoder can determine the location based on the converted access data. The access data can be converted using the mask data and the force data.

Although specific embodiments have been illustrated and as described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device comprising an array of memory cells;
a mode register coupled to the array;
an address decoder coupled to the array; and
a memory controller coupled to the memory device, the memory controller configured to cause performance of a memory access comprising:
   receiving access data associated with a first memory device size to access data stored in the memory device, wherein the memory device is a second memory device size;
   accessing address data in the mode register, wherein the address data in the mode register comprises mask data and force data; and
   accessing the data in the memory device that is the second memory device size using the access data.

2. The apparatus of claim 1, wherein the mask data comprises a number of bits comprising a mask that indicates which bits to modify to access the data in the memory device.

3. The apparatus of claim 1, wherein the force data comprises a number of bits that indicate which bits of the address data to modify.

4. The apparatus of claim 1, wherein the address decoder is configured to receive the mask data and the force data to modify the address data to perform the accessing of the data.

5. The apparatus of claim 1, wherein the force data comprises a number of bits that are used to determine an address to access that is performed in a non-binary fashion.

6. The apparatus of claim 1, wherein the first memory device size is smaller than the second memory device size.

7. The apparatus of claim 1, wherein:
the first memory device size is not divisible by the second memory device size by a factor of 2; or
the second memory device size is not divisible by the second memory device size by a factor of 2.

8. The apparatus of claim 1, wherein:
the first memory device size is 64 gigabytes (GBs) and the second memory device size is 48 GBs; or
the second memory device size is 64 gigabytes (GBs) and the first memory device size is 48 GBs.

9. A method, comprising:
receiving, from an external memory system, access data associated with a first memory device size to access data stored in a memory device, wherein the external memory system is associated with a first memory device size and the memory device is associated with a second memory device size;
accessing address data in a mode register coupled to the memory device, wherein the address data comprises mask data and force data;
converting the access data received from the external memory system from being associated with the first memory device size to being associated with the second memory device size using the address data, wherein the converted access data is sent to an address decoder of the memory device to determine a location in the memory device of data to be accessed; and
accessing the data in the memory device that is the second memory device size using the converted access data.

10. The method of claim 9, wherein converting the access data comprises using the mask data to indicate which portions of the access data to modify.

11. The method of claim 9, wherein the data values stored at the particular locations convert the access data to being associated with the second memory device size.

12. A system, comprising:
a memory device comprising an array of memory cells;
a mode register coupled to the array;
an address decoder coupled to the array; and
a memory controller coupled to the memory device, the memory controller configured to cause performance of a memory access comprising:
receive access data associated with a first memory device size to access data stored in the memory device, wherein the memory device is a second memory device size;
access address data in the mode register, wherein the address data comprises mask data and force data;
convert the access data from being associated with the first memory device size to being associated with the second memory device size using the address data; and
access the data in the memory device that is the second memory device size using the converted access data.

13. The system of claim 12, wherein:
the mask data indicates a portion of the access data to be converted; and
the force data indicates which values to store in the portion of the access data.

14. A system, comprising:
a memory device comprising an array of memory cells;
a mode register coupled to the array, wherein the mode register is configured to store mask data and force data used to convert access data;
an address decoder coupled to the array; and
a memory controller coupled to the memory device, the memory controller configured to cause performance of a memory access comprising:
receive the access data associated with a first memory device size to access data stored in the memory device, wherein the memory device is a second memory device size;
access address data in the mode register;
convert the access data from being associated with the first memory device size to being associated with the second memory device size using the address data, wherein the converted access data is sent to the address decoder to determine a location of the data to be accessed; and
access the data in the memory device that is the second memory device size using the converted access data.

* * * * *